United States Patent [19]

Nasset

[11] Patent Number: 5,413,541

[45] Date of Patent: May 9, 1995

[54] SHIFT CONTROL DEVICE RETROFITTED TO INHIBIT A DOWNSHIFT TO FIRST GEAR IN AN L-POSITION FOR AUTOMOBILE AUTOMATIC TRANSMISSION

[76] Inventor: James L. Nasset, 5157 Dumore Dr. SE., Aumsville, Oreg. 97325

[21] Appl. No.: 7,327

[22] Filed: Jan. 21, 1993

[51] Int. Cl.$^6$ ............................................. F16H 5/28
[52] U.S. Cl. ..................................... 477/81; 477/78
[58] Field of Search .................. 74/866; 364/424.1; 477/78, 81

[56] References Cited

U.S. PATENT DOCUMENTS

| | | | |
|---|---|---|---|
| 5,012,698 | 5/1991 | Hayosaki | 74/866 |
| 5,025,686 | 6/1991 | Sato et al. | 74/866 |
| 5,088,351 | 2/1992 | Miyake et al. | 74/866 |
| 5,089,065 | 2/1992 | Braun | 364/424.1 |
| 5,099,720 | 3/1992 | Raue | 74/866 |
| 5,233,525 | 8/1993 | Overmann et al. | 74/866 X |

FOREIGN PATENT DOCUMENTS

61-157855 7/1986 Japan .................... 477/81

*Primary Examiner*—Dirk Wright
*Assistant Examiner*—Khoi Q. Ta

[57] ABSTRACT

A shift control device for a vehicle's automatic transmission that cannot normally be locked in second gear, but will automatically downshift from second to first gear under predetermined conditions. The shift control device includes a power translator connected to a S-2 shift solenoid of the vehicle, a manual control switch, a frequency-to-voltage converter for receiving a speed signal of the vehicle, and a voltage comparator for comparing a throttle signal of the vehicle and the output from the frequency-to-voltage converter. Without the shift control device, a downshift—in one particular type of transmission—is normally effected when the S-2 shift solenoid is deactivated by the transmission controller. The shift control device is connected to the S-2 shift solenoid in parallel with the transmission controller. When the manual control switch is operated by a user, and the throttle and speed signals are within predetermined ranges, the power transistor will be biased to maintain the S-2 shift solenoid in an activated state independently of the transmission controller to inhibit automatic downshifting.

14 Claims, 4 Drawing Sheets

SHIFT CONTROL DEVICE RETROFITTED TO INHIBIT A DOWNSHIFT TO FIRST GEAR IN AN L-POSITION FOR AUTOMOBILE AUTOMATIC TRANSMISSION

BACKGROUND—FIELD OF INVENTION

This invention relates to automotive automatic transmissions, specifically to such transmissions that use the combination of manual and electronic controls to initiate the shifting of gears.

BACKGROUND—DESCRIPTION OF PRIOR ART

In most automotive vehicles equipped with an automatic transmission there is a provision made for the vehicle operator to manually select the specific transmission gear or gear range as necessary, simply by moving the transmission's gear shift lever to the desired gear position; such as first or second gear. This provision was made so that the vehicle operator would be able to manually shift the gear range in the vehicle transmission so as to control the direction and speed of the vehicle, by controlling the amount of torque and direction of motion that is applied to the operating surface by the vehicle's drive wheels.

For example, if a vehicle operator were descending a steep grade or operating the vehicle on slippery or loose gravel road conditions he may need or wish to slow the vehicle by manually operating the transmission's shift lever to downshift the transmission one gear at a time, thereby allowing the vehicle's forward motion to be retarded by engine compression braking. The proper use of engine compression braking is quite desirable under certain road conditions, to both combat wheel brake overheating and fading, and also to help maintain vehicle directional control without skidding.

If however the vehicle operator-is not able to manually override the automatic operation of the transmission's gear selection, by being able to choose a higher or lower gear when necessary, then the possibility of the vehicle losing control is greatly enhanced. The ability of the vehicle operator to manually control the transmission is especially important on vehicles that are operated under hazardous road and weather conditions, or for towing.

Some vehicles are equipped with a type of automatic transmission that use both manual selection of each specific gear in the transmission, in combination with an electronic shift control unit or device. The shifting of this type of transmission's gears is determined by the position of a manually operated shift lever working in conjunction with the electronic transmission control unit. The transmission's electronic control unit receives and monitors electrical input signals from various sources, such as: the vehicle speed sensor, the throttle position sensor, transmission shift lever position switch, etc.

Depending upon the electrical signals received, the transmission's electronic control unit then generates an output current to other electronic and electrical controls, such as transmission shift solenoids, which control hydraulic fluid in the transmission in such manner as to allow the transmission to change gears.

Some heretofore known electronically controlled automatic transmissions suffer from a number of disadvantages:

(a) Their manual gear selection combines first and second gear as one gear shift position.

(b) The operator is not given the option of manual selection of each specific gear in the combine first and second gear position, instead the gear selection is made by the transmissions electronic control unit.

(c) When their manual gear selection lever is placed in the combined first and second gear position their electronic control unit can cause an unexpected and abrupt automatic downshift to first gear at a much higher rate of vehicle speed than is desirable.

(d) At this higher rate of speed such unexpected and abrupt automatic downshift to first gear causes excessive rotational torque to be applied to the drive wheels, through engine compression braking, which can lead to skidding and loss of vehicle control especially on slippery or loose gravel surfaces.

(e) Such excessive rotational torque abruptly applied to the drive wheels, when the transmission automatically downshifts to first gear, produces undue stress on the vehicle drive train which can lead to premature drive train component failure.

(f) The excessive rotational torque abruptly applied to the drive wheels, when the transmission automatically downshifts to first gear, causes a rapid deceleration of the vehicle, which can lead to the dislodging of unsecured objects and passengers, and the possibility of such being damaged or injured.

(g) The aforementioned transmissions electronic computer control will not allow the transmission to remain in second gear when the operator places the manual gear selector lever in the combined first and second gear position.

OBJECTS AND ADVANTAGES

Accordingly several objects and advantages of my present invention are:

(a) to provide an electronic control shifting device that can be either incorporated into, or used in conjunction with the present transmission's electronic control unit and circuits, that when manually operated will cause the aforementioned computer controlled automatic transmission to shift between first and second gear when the transmissions shift lever is in the combined first and second gear position.

(b) to provide the operator of such transmission the option of manual selection of first or second gear, or of having the present transmission's computer shift control unit automatically select the gear, when the transmissions shift lever is in the combined first and second gear position.

(c) to provide an electronic control shifting device that when manually operated will allow the operator to eliminate the transmission's unexpected and abrupt automatic downshift to first gear, when the transmission's shift lever is in the combined first and second gear position.

(d) to provide an electronic control shilling device that, when manually operated, will allow the operator to select second gear when the transmission's shift lever is in the combined first and second gear position and will prevent the transmission from automatically downshifting to first gear, thus minimizing the excessive rotational torque being abruptly applied to the drive wheels through engine compression braking, that might otherwise result in skidding and loss of control.

(e) to provide an electronic control shifting device that, when manually operated when the transmission shift lever is in the combined first and second gear position, will minimize excessive rotational torque being abruptly applied to the drive wheels through the aforementioned engine compression braking, by not allowing the transmission to automatically downshift to first gear, thus eliminating the undue stress that is placed on the drive train and diminishing the occurrence of premature drive train component failure.

(f) to provide an electronic control shifting device that, when manually operated, with the transmission shift lever is in the combined first and second gear position, will minimize excessive rotational torque being abruptly applied to the drive wheels, by not allowing the transmission to automatically downshift to first gear, thus eliminating the rapid deceleration of the vehicle, which lessens the chance of an unsecured object or passenger being dislodged, and the possibility of such being damaged or injured.

(g) to provide an electronic control shifting device, that when manually operated, will allow the aforementioned transmission to remain in second gear when the transmissions shift lever is in the combined first and second gear position.

Further objects and advantages are that the vehicle operator by having the flexibility of shifting between first and second gear when the aforementioned transmission shift lever is in the combined first and second gear position, are that the operator can start out in second gear when on icy or other slippery road conditions, thus imparting less rotational torque to the drive wheels and therefore able to attain greater traction.

The manually operated electronic shift control device will allow the vehicle operator to manually shift the transmission to second gear and remain there when in slow driving conditions such as in city rush hour traffic without tide constant and unexpected automatic downshifting and upshifting that now occurs on prior art. In hot weather this will allow the vehicle's air conditioner to operate more efficiently while consuming less fuel than if the transmission automatically shifted to first gear. Still other objects and advantages will become apparent from a consideration of the ensuing description and drawings.

DRAWING FIGURES

In the drawings, electrical and electronic connections between the circuits of the electronically controlled automatic transmission and circuits of the present invention have the same number but different alphabetic suffixes.

Figure 1:
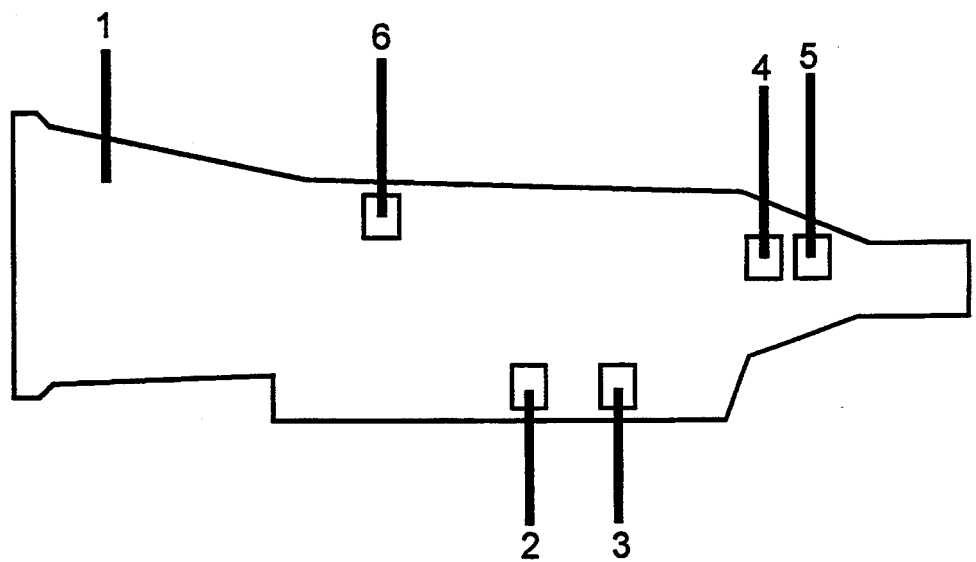
FIG. 1 is a schematic view of an computer controlled automatic transmission to which a control system according to the present invention is used.

| Reference Numerals In Drawings | | | |
|---|---|---|---|
| 1 | electronically controlled automatic transmission | 2 | S-2 shift solenoid |

| -continued | | | |
|---|---|---|---|
| Reference Numerals In Drawings | | | |
| 3 | S-1 shift solenoid | 4 | vehicle speed sensor rotating magnet |
| 5 | vehicle speed sensor magnetic reed switch | 6 | combined first-second gear position switch |
| 8 | vehicle's transmission electronic control unit | 14 | manually operated shift control switch |
| 22 | vehicle speed sensor signal conductor | 22a | vehicle speed sensor signal current input |
| 24 | S-2 shift solenoid current conductor | 24a | S-2 shift solenoid control current output |
| 25 | S-1 shift solenoid current conductor | 26 | throttle position sensor signal conductor |
| 26a | throttle position sensor signal current input | 30 | manually operated shift position control lever |
| 32 | third gear shift lever position | 34 | combined first-second gear shift position |
| 38 | throttle position sensor | 48 | voltage potential from vehicle electrical system |
| 52 | ground potential from vehicle electrical system | 52a | ground potential input from vehicle electrical system |
| 54 | frequency to voltage converter | 56 | voltage comparator |
| 58 | S-2 shift solenoid control transistor | 59 | blocking diode |
| 62 | S-2 shift solenoid energized indicator | 64 | combined first-second gear position switch current conductor. |
| 64a | combined first-second gear switch current conductor input. | 70 | vehicle battery |

Description—FIGS. 1 to 4

FIG. 1 shows a representative schematic drawing of a computer controlled automatic transmission 1 which is comprised in part of electrically operated S-2 shift solenoid 2, S-1 shift solenoid 3, vehicle speed sensor rotating magnet 4, vehicle speed sensor magnetic reed switch 5, and combined first-second gear position switch 6.

Figure 2:
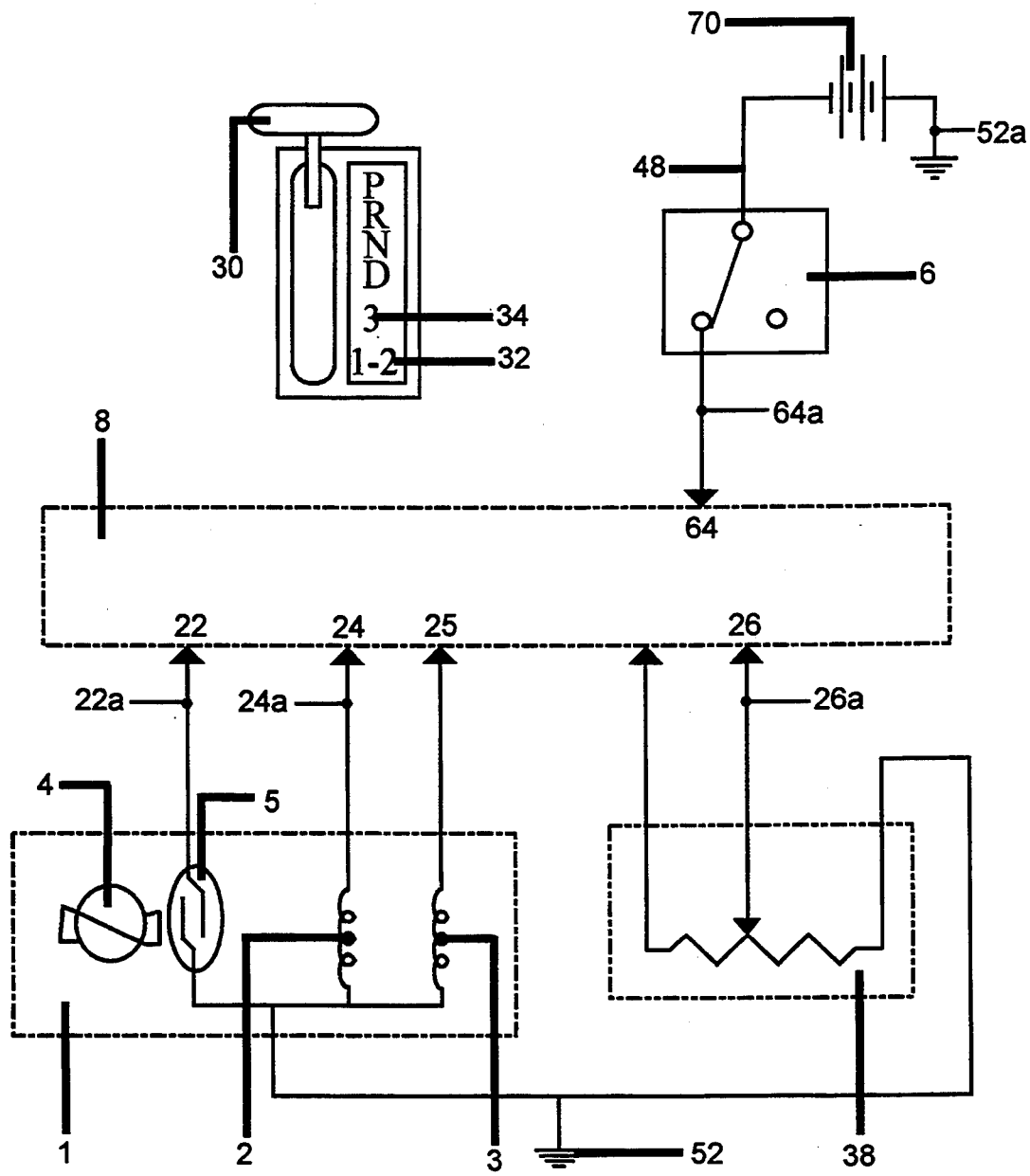
FIG. 2 shows an electrical schematic of components of a computer controlled automatic transmission that are applicable to the use of the present invention.

FIG. 2 shows a schematic of the components of an electronically controlled automatic transmission that are applicable to the present invention and is comprised of S-2 shift solenoid 2, S-1 shift solenoid 3, vehicle speed sensor rotating magnet 4, vehicle speed sensor magnetic reed switch 5, combined first second gear position switch 6, vehicle's transmission electronic control unit 8, vehicle speed sensor signal conductor 22, S-2 shift solenoid current conductor 24, S-1 shift solenoid current conductor 25, throttle position sensor signal conductor 26, manually operated shift position control lever 30, third gear shift lever position 32, combined first-second gear shift position 34, throttle position sensor 38, direct current voltage potential from vehicle electrical system 48, vehicle battery 70, combined first-second gear position switch current conductor 64, and ground potential from vehicle electrical system 52.

Figure 3:
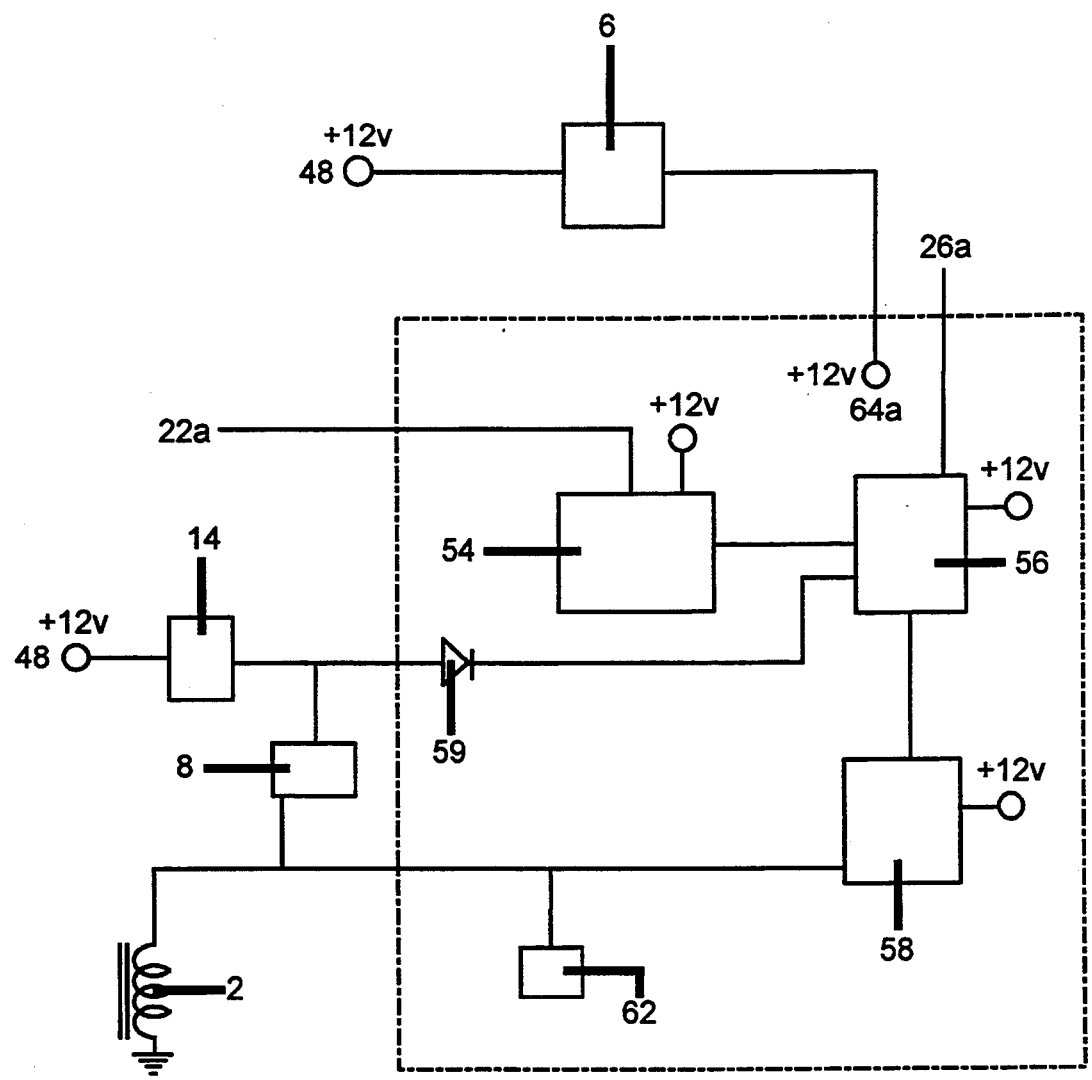
FIG. 3 is a simplified block diagram showing an electrical circuit provided in the system of the present invention.

FIG. 3 shows a simplified partial block diagram of the electronic components and circuitry of the present invention which is comprised in part of frequency to voltage converter 54, voltage comparator 56, S-2 shift solenoid control transistor 58, S-2 shift solenoid energized indicator 62 and blocking diode 59. Also shown are various input and output signal conductor components and connection points. These are: voltage potential frown vehicle electrical system 48, combined first-second gear position switch 6, manually operated shift control switch 14, vehicle speed sensor current input 22a, S-2 shift solenoid 2, throttle position sensor signal input 26a, and the vehicle's transmission electronic control unit 8.

Figure 4:
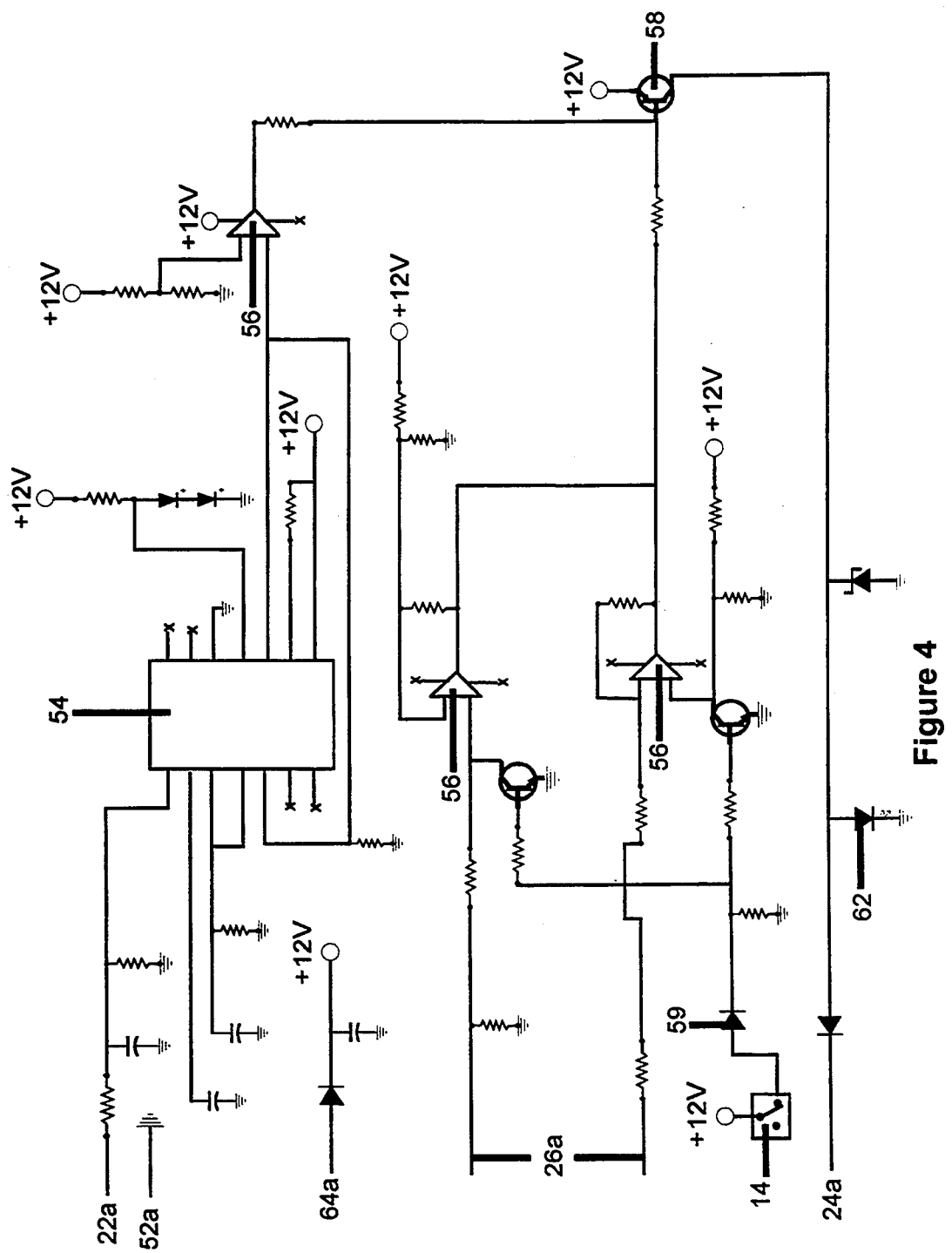
FIG. 4 shows an electrical and electronic circuit schematic of the present invention.

FIG. 4 shows an electronic circuit schematic of the present invention comprised of S-2 shift solenoid control current output 24a, throttle position sensor signal current input 26a, combined first-second gear position switch current conductor input 64a, voltage potential from vehicle electrical system 48, ground potential from vehicle electrical system 52a, vehicle speed sensor signal current input 22a, frequency to voltage converter 54, voltage comparator 56, S-2 shift solenoid control transistor 58, S-2 shift solenoid energized indicator 62, blocking diode 59 and manually operated shift control switch 14.

Operation—FIGS. 1, 2, 3, 4

Referring to FIG. 1, when electronically controlled automatic transmission 1 is operating in the third gear shift mode, the combined first-second gear position switch 6 is in a de-energized state, vehicle speed sensor rotating magnet 4 is rotating in direct relation to vehicle speed and generating a pulse frequency in vehicle speed sensor magnetic reed switch 5, S-2 shift solenoid 2 is energized and S-1 shift solenoid 3 is de-energized.

Referring to FIG. 2, when electronically controlled automatic transmission's manually operated shift control lever 30 is in third gear shift position 32 with vehicle traveling at highway speeds, vehicle speed sensor magnet reed switch 5 in combination with the rotation of vehicle speed sensor rotating magnet 4 produces a pulse signal current that is transmitted to the vehicle's transmission electronic control unit 8 through vehicle speed sensor signal current conductor 22. This speed sensor signal in combination with the current generated by the throttle position sensor 38 transmitted through throttle position sensor signal conductor 26 to the vehicle's transmission electronic control unit 8, cause the vehicle's transmission electronic control unit 8 to supply a control current to S-2 shift solenoid 2 through S-2 shift solenoid current conductor 24 thus keeping S-2 shift solenoid 2 energized, which causes the aforementioned automatic transmission to remain in third gear.

When the manually operated shift control lever 30 is moved from third gear shift lever position 32 to combined first-second gear shift lever position 34 combined first-second gear position switch 6 is activated to the electrically closed position causing an electrical signal to be transmitted through combined first-second gear position switch current conductor 64 to vehicle's transmission electronic control unit 8, which causes vehicle's electronic control unit 8 to energize S-1 shift solenoid 3 by applying control current through S-1 shift solenoid current conductor 25 to S-1 shift solenoid 3. When S-1 shift solenoid 3 is energized in combination with S-2 shift solenoid 2 being energized, the transmission automatically shifts to second gear.

The vehicle's transmission electronic control unit 8 monitors the signal present in the vehicle speed sensor current conductor 22 and when the vehicle speed decreases to a predetermined factory designed speed of approximately twenty five to thirty miles per hour, the vehicle's transmission electronic control unit 8 removes the control current from S-2 shift solenoid 2.

When S-2 shift solenoid 2 is de-energized while S-1 shift solenoid 3 remains energized, the transmission automatically shifts to first gear. The aforementioned automatic transmission will remain in first gear unless the manually operated shift position control lever 30 is moved to third gear shift lever position 32 or until the vehicle speed increases to a predetermined factory designed speed of approximately forty to forty-five miles per hour, at which time the vehicle's transmission electronic control unit 8 will apply control current to S-2 shift solenoid 2 causing it to energize, thus allowing the transmission to automatically shift to second gear.

Referring to FIG. 3 showing a simplified block diagram of the system of the present invention, combined first-second gear selection switch 6 is electrically connected in series between voltage potential flora vehicle electrical system 48 and first-second gear position switch current conductor 64 which is electrically connected in parallel with vehicle's transmission control unit 8 and blocking diode 59, which supplies voltage to frequency to voltage converter 54, voltage comparator 56 and S-2 shift solenoid control transistor 58.

When the combined first-second gear position switch 6 is closed voltage potential from vehicle electrical system is supplied to the heretofore mentioned items 54, 56, and 58. At the same vehicle's transmission control trait 8 receives an input signal from combined first-second gear position switch current conductor 54 indicating that the manually operated shift position control lever 30 FIG. 2 has been moved to the combined first-second gear shift position 34 FIG. 2.

Manually operated shift selector switch 14 is connected in series with voltage potential from vehicle electrical system 48 and specific circuits of voltage comparator 56.

When closed, manually operated shift selector switch 14 supplies operating voltage to the aforementioned circuits of voltage comparator 56.

Depending upon the signals present at vehicle speed sensor signal current input 22a, throttle position sensor signal current input 26a and from frequency to voltage converter 54, voltage comparator 56 applies or removes a control signal from the base of S-2 shift solenoid control transistor 58 which then applies to, or removes a control voltage from S-2 shift solenoid 2. S-2 shift solenoid energized indicator is lamp 62 is illuminated whenever S-2 shift solenoid control transistor 58 applies a control voltage to S-2 shift solenoid 2.

Referring to FIG. 4 showing a partial electrical and electronic circuit schematic of the present invention, when the voltage potential from vehicle electrical system 48 is applied to combined first-second gear position switch current conductor 64 FIG. 2, parallel connected combined first-second gear switch current conductor input 64a receives this voltage potential, which is then applied to blocking diode 59 and thence to the components connected in parallel with blocking diode 59, which causes all such parallel connected components to become energized.

When a pulse signal current is present at the vehicle speed sensor signal conductor 22 FIG. 2 it is also present at the parallel connection vehicle speed sensor signal current input 22a. The aforementioned pulse signal is received by frequency to voltage converter 54 and is converted into a voltage potential which is filtered through connecting circuits and then is applied to a specific circuit of voltage comparator 56. Any change in vehicle speed thus results in corresponding change in the voltage applied to the aforementioned specific circuit of voltage comparator 56. As vehicle speed increases the voltage potential applied to this previously mentioned specific circuit of voltage comparator 56 also increases. When the voltage potential in this heretofore mentioned specific circuit of voltage comparator 56 increases beyond a predetermined reference voltage, an output signal from voltage comparator 56 is applied to the base of S-2 shift solenoid control transistor 58, which when present, will not allow S-2 shift solenoid control transistor 58 to conduct current to S-2 shift solenoid control current output 24a.

When the vehicle operator increases or decreases throttle pressure, throttle position sensor 38 FIG. 2 detects the throttle increase or decrease and varies the voltage potential present at throttle position sensor signal conductor 26 FIG. 2. Any resultant change in voltage potential at throttle position sensor signal conductor 26 FIG. 2 is also present at the parallel connection of throttle position sensor signal current input 26a. Any change in throttle position thus causes a change in the voltage applied to a specific circuit of voltage comparator 56.

Depending upon the value of the predetermined reference voltage of the above mentioned specific circuit of voltage comparator 56, the subsequent change in voltage causes an output signal to be applied to the base of S-2 shift solenoid control transistor 58 by voltage comparator 56, which when present, will not allow S-2 shift solenoid control transistor 58 to conduct current to S-2 shift solenoid control current output 24a.

The closing of manually operated shift control switch 14 causes the voltage potential from vehicle electrical system 48 to be applied to additional specific circuits of voltage comparator 56. The application of the heretofore mentioned voltage potential to these additional specific circuits of voltage comparator 56 causes an output signal to be applied to the base of S-2 shift solenoid control transistor 58 by voltage comparator 56, which when present, will not allow S-2 shift solenoid control transistor 58 to conduct current to S-2 shift solenoid control current output 24a.

In conclusion, with the present invention incorporated into the aforementioned automatic transmission's control circuit; and if the following conditions exist, that is: manually operated shift control switch 14 is in the open position, the combined first-second gear position switch 6 is in the closed position, and throttle position sensor current input 26a remains within a predetermined range, then control voltage will be applied to S-2 shift solenoid control current output 24a by the circuitry of the present invention, and the automatic transmission will remain in second gear whether or not a control signal is present from the vehicle's transmission control unit 8 at S-2 shift solenoid current conductor 24.

Conversely however if any one or combination of the about to be mentioned conditions exist: manually operated shift control switch 14 is in the closed position, the combined first-second gear switch 6 is in the open position, and or the throttle position sensor signal current does not remain within it's predetermined range, then control voltage will not be applied to S-2 shift solenoid by the circuitry of the present invention, but instead, operation of S-2 shift solenoid will be controlled only by the operation of the vehicle's transmission control unit 8 acting upon it.

SUMMARY, RAMIFICATIONS, AND SCOPE

Accordingly the reader will see that the electronic shift control device for automotive automatic transmissions of this invention can be used to control the shifting of each gear in the combined first-second gear position, that is used on the previously described prior art.

Furthermore the electronic shift control device liar automotive automatic transmissions has the additional advantages in that:

it permits the operator of such vehicle equipped with the present invention, to have improved comfort, safety and control of the vehicle, by being able to choose either first or second gear whenever the manually operated shift position control lever is in the combined first-second gear position.

it allows the vehicle operator the option of having control over the selection of each gear when in the combined first-second gear position which is especially important while driving during slippery or icy road conditions, or when towing a trailer or boat.

it will prevent the sudden and unexpected automatic downshift that can cause skidding and loss of vehicle control caused by excessive rotational torque being applied to the drive wheels, that now occurs with the previously described prior art.

it will decrease the likelihood of injury or damage to unsecured occupants or objects now experienced from them being dislodged by the unexpected automatic downshift to first gear, that can now occur with the previously described prior art, when in the combined first-second gear shift position.

it will eliminate the undue stress that is now being placed on the drive train caused by the premature automatic downshift that occurs in the combined first-second gear shift position that creates excessive rotational torque which is applied to the drive wheels, thus diminishing the occurrence of premature drive train and component failure.

it provides an inexpensive and novel way of improving the operation and performance of the above mentioned prior art while solving the hazardous control problem that now exists.

it, by design being a parallel connected control system device does not require that any conductor in the present transmission's electronic control circuitry need be opened, thus maintaining the aforementioned present control circuitry's integrity. This novel and unobvious connection means assures that a circuit failure in the present invention will not cause a detrimental effect on the operation of the above mentioned transmission. Also the use of a current blocking diode between the circuit of the above mentioned transmission's electronic control circuitry and the present invention, blocks any signal from the present invention to it, that might adversely affect the transmissions normal operation.

Although the description above contains many specificities, these should not be construed as limiting the scope of the invention but merely providing illustrations of some of the presently preferred embodiments of this invention. For example, the shift control device circuitry can either be incorporated into the heretofore mentioned present prior art transmission's electronic control unit circuitry during manufacture, or it could be added to the previously manufactured transmission's electronic control circuitry as an after market item; electronic components other than those specified could be used to cause the same effect such as; an electrical or mechanical relay could be used in place of the S-2 shift solenoid control transistor etc.

Thus the scope of the invention should be determined by the appended claims and their legal equivalents, rather than by the examples given.

I claim:

1. A shift control device for inhibiting an automatic downshift to a first gear from a second gear in an automatic transmission of a vehicle, the second gear being normally engaged when a plurality of solenoids in the transmission are set in a predetermined energization pattern by a transmission controller provided with the transmission, the downshift to the first gear being normally effected when the transmission controller sets the solenoids in a different energization pattern, the shift control device comprising:

control means having an output adapted to be connected to at least one of the solenoids to supply power thereto to maintain the solenoids in the predetermined energization pattern, and a user operated switch connected to said control means for activiting and deactivating the output, wherein the solenoids are maintained in the predetermined energization pattern by said control means, when activated by said user operated switch to cause the transmission to remain in the second gear instead of downshifting.

2. The shift control device of claim 1 wherein said control means comprises a power transistor connected between a battery of the vehicle and said one of the solenoids.

3. The shift control device of claim 1 wherein the transmission controller includes a gear position switch that is closed when a shift-lever of the vehicle is moved to a lowest gear-range position, the gear position switch being connected to a battery of the vehicle, said control means adapted to be connected to the gear position switch for receiving power when the shift-lever is moved to the lowest gear-range position.

4. The shift control device of claim 3, further including a diode connected in circuit with the gear position switch the shift control device and said control means for inhibiting current flow from the shift control device to said control means.

5. The shift control device of claim 1 wherein said control means comprises a power transistor connected between a battery of the vehicle and said one of the solenoids and a first voltage comparator adapted to be connected to a throttle position sensor of the vehicle, the first voltage comparator being calibrated for biasing the power transistor when a signal from the throttle position sensor is within a predetermined range.

6. The shift control device of claim 5, further including a frequency-to-voltage converter adapted to convert a repetitive signal from a speed sensor of the vehicle to a voltage, the frequency-to-voltage converter connected to a second voltage comparator connected to the power transistor, the second voltage comparator calibrated for biasing the power transistor when the repetitive signal from the speed sensor is within a predetermined frequency range.

7. The shift control device of claim 1, further including an indicator light connected to the output of said control means for indicating when the switch is operated and the transmission is maintained in the second gear.

8. A shift control device for inhibiting an automatic downshift to a first gear from a second gear in an automatic transmission of a vehicle, the second gear being normally engaged when a plurality of solenoids in the transmission are set in a predetermined energization pattern by a transmission controller connected thereto provided with the transmission, the downshift to the first gear being normally effected when the transmission controller sets the solenoids in a different energization pattern, the shift control device comprising:

power supply means having an output adapted to be connected to at least one of the solenoids in parallel with the transmission controller for energizing said one of the solenoids independently of the transmission controller, and a user operated switch connected to said power supply means for activating and deactivating the output, wherein the solenoids are maintained in the predetermined energization pattern by said power supply means when activated by said user operated switch to cause the transmission to remain in the second gear instead of downshifting.

9. The shift control device of claim 8 wherein said power supply comprises a power transistor connected between a battery of the vehicle and said one of the solenoids.

10. The shift control device of claim 8 wherein the transmission controller includes a shift-lever switch that is closed when a shift-lever of the vehicle is moved to a lowest gear-range position, the shift-lever switch being connected to a battery of the vehicle, said power supply means adapted to be connected to the shift-lever switch for receiving power when the shift-lever is moved to the lowest gear-range position.

11. The shift control device of claim 10, further including a diode connected in circuit with the shift-lever switch and said power supply means for inhibiting current flow from the shift control device to said power supply means.

12. The shift control device of claim 8 wherein said power supply means comprises a power transistor connected between a battery of the vehicle and said one of the solenoids and a first voltage comparator adapted to be connected to a throttle position sensor of the vehicle, the first voltage comparator being calibrated for biasing the power transistor when a signal from the throttle position is within a predetermined range.

13. The shift control device of claim 12, further including a frequency-to-voltage converter adapted to convert a repetitive signal from a speed sensor of the vehicle to a voltage, the frequency-to-voltage converter connected to a second voltage comparator calibrated for biasing the power transistor when the repetitive signal from the speed sensor is within a predetermined frequency range.

14. The shift control device of claim 8, further including an indicator light connected to the output of said power supply means for indicating when the switch is operated and the transmission is maintained in the second gear.

* * * * *